United States Patent
Pardue

(10) Patent No.: US 11,943,308 B1
(45) Date of Patent: Mar. 26, 2024

(54) DYNAMICALLY MODIFYING HTTP CONNECTIONS

(71) Applicant: CLOUDFLARE, INC., San Francisco, CA (US)

(72) Inventor: Lucas Pardue, Wallington (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/148,352

(22) Filed: Dec. 29, 2022

(51) Int. Cl.
  *H04L 67/142* (2022.01)
  *H04L 67/02* (2022.01)
  *H04L 67/143* (2022.01)

(52) U.S. Cl.
  CPC .......... *H04L 67/142* (2013.01); *H04L 67/02* (2013.01); *H04L 67/143* (2013.01)

(58) Field of Classification Search
  CPC ...... H04L 67/02; H04L 43/08; H04L 43/0876
  See application file for complete search history.

(56) References Cited

U.S. PATENT DOCUMENTS

| | | | |
|---|---|---|---|
| 10,057,390 B2 * | 8/2018 | Perlmutter | H04L 63/168 |
| 10,075,468 B2 * | 9/2018 | Kish | H04L 67/02 |
| 2016/0080395 A1 * | 3/2016 | Reddy | H04L 61/5007 726/23 |

OTHER PUBLICATIONS

R. Polli, A. Martinez, RateLimit Header Fields for HTTP (ietf.org), draft-polli-ratelimit-headers-02, Standards Track, Mar. 3, 2020 (Year: 2020).*
Belshe, M., et al., "Hypertext Transfer Protocol Version 2 (HTTP/2)", Internet Engineering Task Force (IETF) Request for Comments: 7540, May 2015, 96 pages.
Choi, J., "Delivering HTTP/2 upload speed improvements", Cloudflare, Aug. 24, 2020, pp. 1-14.
Iyengar, J., et al., "RFC 9000 QUIC: UDP-Based Multiplexed and Secure Transport", Internet Engineering Task force (IETF), May 2021, 127 pages.
Oku, K., et al., "An HTTP Status Code for Indicating Hints", Internet Engineering Task Force (IETF), Request for Comments: 8297, Dec. 2017, pp. 1-7.

* cited by examiner

*Primary Examiner* — Chirag R Patel
(74) *Attorney, Agent, or Firm* — NICHOLSON DE VOS WEBSTER & ELLIOTT LLP

(57) ABSTRACT

A condition exists that triggers an HTTP server to modify one or more HTTP connections for one or more HTTP clients that are connected to the HTTP server. The HTTP server dynamically modifies the one or more HTTP connections including dynamically modifying one or more HTTP connection resource parameters for the one or more HTTP connections. For each of the one or more HTTP clients, the HTTP server monitors that HTTP client to determine whether it is complying with the modified one or more HTTP connection resource parameters. If one of the one or more HTTP clients is not complying with the modified one or more HTTP connection resource parameters, the HTTP server closes an HTTP connection to that HTTP client.

21 Claims, 3 Drawing Sheets

DYNAMICALLY MODIFYING HTTP CONNECTIONS

FIELD

Embodiments of the invention relate to the field of network connections; and more specifically, to dynamically modifying HTTP connections.

BACKGROUND

The Hypertext Transfer Protocol (HTTP) has common semantics (metadata, content, requests, responses, etc.) and version-specific formats that express these semantics over networks (the wire format). The current defined versions are HTTP/1.1, HTTP/2, and HTTP/3. HTTP/1.1 is defined in Request For Comments (RFC) 9112 dated June 2022, HTTP/2 is defined in RFC 9113 dated June 2022, and HTTP/3 is defined in RFC 9114 dated June 2022. Both HTTP/2 and HTTP/3 can consolidate multiple concurrent requests and responses onto a single connection. There are application-level-controlled connection resources such as streams and flow control. Clients can generate much work by initiating multiple concurrent requests on a single connection, within the resource limits set by the server (e.g., up to 245 concurrent requests). In contrast, HTTP/1.1 concurrency is often restricted by clients to 6 TCP connections per hostname. Some existing rate limiting features can control TCP connections but those measures do not apply to HTTP/2 or HTTP/3 where there is generally just a single connection. Connection coalescing is more likely to exacerbate this scenario.

Conventionally, HTTP/2 and HTTP/3 servers advertise their resource parameters during connection setup. For example, for HTTP/2 this is done via the exchange of SETTINGS, and in HTTP/3 this is done via the exchange of QUIC transport parameters. These resource parameters are often static values that do not often change over time or for different user agents.

SUMMARY

A condition exists that triggers an HTTP server to modify one or more HTTP connections for one or more HTTP clients that are connected to the HTTP server. The HTTP server dynamically modifies the one or more HTTP connections including dynamically modifying one or more HTTP connection resource parameters for the one or more HTTP connections. For each of the one or more HTTP clients, the HTTP server monitors that HTTP client to determine whether it is complying with the modified one or more HTTP connection resource parameters. If one of the one or more HTTP clients is not complying with the modified one or more HTTP connection resource parameters, the HTTP server closes an HTTP connection to that HTTP client.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
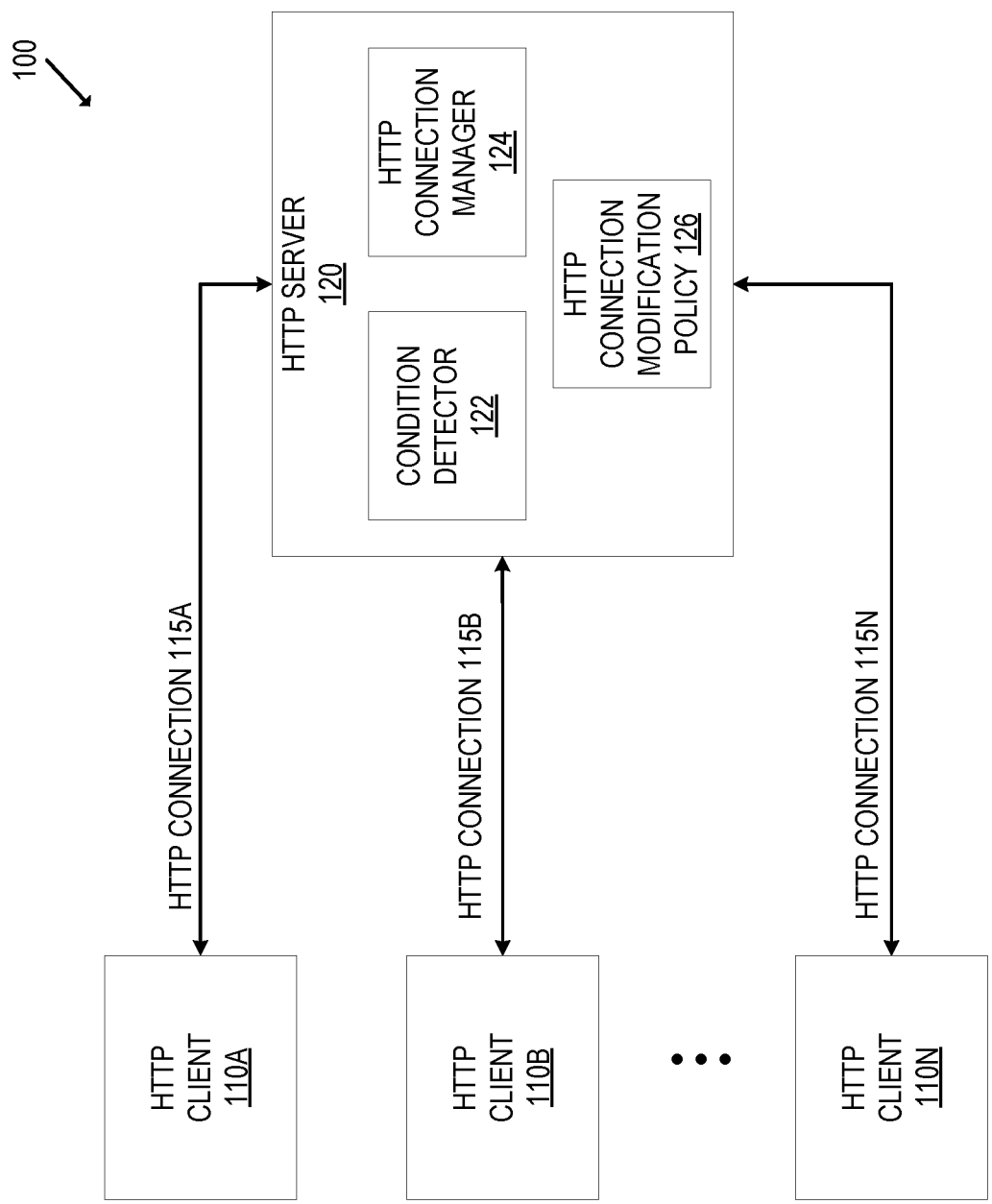
FIG. 1 illustrates an exemplary system for dynamically modifying an HTTP connection according to an embodiment.

Dynamically modifying an HTTP connection is described. A condition is determined to exist that triggers an HTTP server to make a change that affects one or more HTTP connections (e.g., one or more HTTP/2 and/or one or more HTTP/3 connections). The trigger condition may be a hardware resource condition of the server (e.g., server CPU usage greater than a threshold, server memory usage greater than a threshold), a characteristic of a request (e.g., user agent, source IP address), a threat score of the request and/or client being above a threshold, a malicious client detected, malicious behavior detected, and/or protocol misuse detected. The trigger condition may reflect an increased server workload and/or an expectation of future increased server workload. Responsive to determining the condition exists, the HTTP server makes a modification that affects one or more HTTP connections. The modification may affect existing HTTP connection(s) and/or new HTTP connection(s). The modification may include dynamically modifying HTTP connection resource parameter(s) and/or modifying one or more runtime behaviors for the HTTP connection(s). The modification(s) may reduce the workload and/or future expected workload. An HTTP connection that does not respect the modification may be closed with an error.

Dynamically modifying HTTP connections provides advantages. For example, dynamically modifying HTTP connections responsive to detecting a condition may allow the server to dynamically reduce its workload in cases of burst or prolonged workload. Dynamically modifying HTTP connections reduces HTTP resource allocation to help reduce the burden of existing or new HTTP connections. This may help avoid or mitigate, for example, denial of service attacks by reducing server load so that HTTP requests can be timely served. Further, applying HTTP connection resource constraints allows for pacing of HTTP requests over that connection. This prevents a client from bursts of activity that can overwhelm a server. Slowing the rate of HTTP activity allows server capacity usage to be more evenly distributed.

In some aspects, the dynamic modification involves the client in the resource control by sending the client different parameters, which makes the client indirectly aware of the situation in accordance with the interoperable mechanisms supported by HTTP/2 and HTTP/3. If the client is unaware that it can be causing problems, the client may continue to invoke retransmission and/or retry behavior that causes excess load on the server.

In some aspects, instead of failing requests by resetting streams or closing connections, which can lead to data loss or interruption at the client (e.g., a web page can stop working because a critical resource was not delivered), dynamically modifying the connection allows for the data to be transmitted to the client albeit at a slower pace.

In some aspects, the dynamic modification is performed for connections associated with personal or small business accounts and may not be performed for connections associated with enterprise accounts. This reduces the resources available for the personal or small business accounts to free resources for enterprise level accounts.

In some aspects, the dynamic modification is performed differently within a connection. For instance, flow control of individual streams can exert back pressure on the client, so controlling those differently for streams in the same connection is a dynamic method that supports many types of control. For example, allowing a fraction of streams to be higher bandwidth than others (perhaps based on the nature of the HTTP request itself).

FIG. 1 illustrates an exemplary system for dynamically modifying an HTTP connection according to an embodiment. The system 100 includes the HTTP clients 110A-N connecting to the HTTP server 120 over the HTTP connections 115A-N respectively. The HTTP connections can use different HTTP versions including HTTP/1.1, HTTP/2, and/or HTTP/3. Each HTTP client is typically executed on a client computing device such as a laptop, desktop, smartphone, tablet, gaming system, set top box, wearable device, etc., that can transmit and receive HTTP traffic. Each HTTP client can be a client network application, such as a browser, or other native application that transmits and receives HTTP traffic.

The HTTP server 120 accepts connections from the HTTP clients 110A-N. The HTTP server 120 can be implemented on a server computing device. The HTTP server 120 may include multiple components including a component for terminating TLS connections and a component to terminate HTTP connections. The HTTP server 120 includes a condition detector 122 and an HTTP connection manager 124. Although not illustrated in FIG. 1, the server may include one or more other components including one or more security components and/or one or more performance components. The one or more security components may include a denial-of-service (DoS) detection and mitigation component, a web application firewall, a threat detecting and blocking component, an access control component, and/or a rate limiting component. The one or more performance components may include components to perform performance services including a content delivery network, caching, video delivery, website optimizations (e.g., asynchronous loading, image optimizations, mobile optimizations), load balancing, intelligent routing, availability, and/or protocol management (e.g., IPv4/v6 gateway).

The condition detector 122 detects whether a condition exists that triggers the HTTP server 120 to modify an HTTP connection. These conditions are sometimes referred herein as trigger conditions. The trigger condition(s) may be defined in the HTTP connection modification policy 126. The HTTP connection modification policy 126 defines the criteria for a trigger condition and may define the action(s) to take upon the criteria being met. For instance, the trigger condition(s) may be a hardware resource condition of the server, a characteristic of an HTTP request, a threat score of the request and/or client being above a threshold, a malicious client detected, malicious behavior detected, and/or detected protocol misuse. The previous trigger conditions are examples and the condition detector 122 may detect different trigger conditions based on any defined policy. The trigger condition(s) and the action(s) may be defined by an administrator of the HTTP server 120 and/or a customer of the HTTP server 120. Although not illustrated in FIG. 1, the server and/or the system may include a configuration component that provides an interface to allow an administrator to configure the system such as the HTTP connection modification policy 126.

Example hardware resource trigger conditions include if CPU usage is greater than a threshold, memory usage is greater than a threshold, disk usage is greater than a threshold, data queue is greater than a threshold, and/or network activity is greater than a threshold. The threshold(s) may be defined by an administrator of the server. The condition detector 122 may continually check whether a hardware resource trigger condition exists.

Example characteristics of an HTTP request include specific user agents (e.g., user agents that are suspected as being malicious bots), and/or specific source IP addresses (e.g., source IP addresses that are suspected of sending malicious traffic). The request characteristics may be defined by an administrator of the server. The condition detector 122 may check for these characteristics responsive to the HTTP server 120 receiving a request.

An HTTP request may be associated with a threat score and/or the HTTP client may be associated with a threat score. The threat score represents the likelihood of whether the request and/or client is malicious. The server may include a component to generate the threat score or receive such a threat score. The thresholds may be defined by an administrator of the server. The condition detector 122 may check whether the threat score of the request and/or the HTTP client is above a threshold responsive to the HTTP server 120 receiving a request.

Detecting malicious behavior of the client may be a pattern of behavior based on a certain traffic pattern (e.g., many concurrent requests that have been determined to be an attack to force the server to consume excess memory and/or CPU). The condition detector 122 may detect the pattern of behavior and/or another component of the HTTP server 120 may detect the pattern of behavior and notify the condition detector 122 of the pattern detection.

Protocol misuse may include a malicious client requesting the HTTP server 120 generate a response where the client has no intention of reading the response to force the HTTP server 120 to consume excess memory and/or CPU. Example protocol misuse includes: the client requesting a large amount of data from a resource over multiple streams where the window size and stream priority are manipulated; the client continually transmits pings to the server to build an excessive response queue; the client creates multiple request streams and shuffles the priority of the streams to cause churn to the priority tree; the client opens streams and sends an invalid request over each stream to solicit a stream of RST_STREAM frames from the server; the client sends a stream of SETTINGS frames to the server to force the server to acknowledge each frame; the client transmits a stream of headers with a zero length header frame and a zero length header value; the client opens an HTTP/2 window but leaves the TCP window closed so the server cannot write most of the data and then sends a stream of requests for a large response object; and the client transmits a stream of frames with an empty payload and without the end-of-stream flag. The condition detector 122 may detect the protocol misuse and/or another component of the HTTP server 120 may detect protocol misuse and notify the condition detector 122 of the detected protocol misuse.

The HTTP connection modification policy 126 may define the action(s) to take upon the criteria of a trigger condition being met. These action(s) are performed by the HTTP connection manager 124 and they affect one or more HTTP connections. The HTTP connection manager 124 dynamically modifies HTTP connection resource parameter(s) for HTTP connection(s) and/or modifies one or more runtime behaviors for the HTTP connection(s).

Dynamically controlling HTTP connection resource parameters may include signaling existing HTTP connections with dynamically modified connection resource parameter(s) and/or setting new connections with dynamically modified connection resource parameter(s) (e.g., new HTTP/2 connections and/or new HTTP/3 connections). The modified connection resource parameter(s) may reduce or restrict properties of an HTTP connection. The connection resource parameters can include a setting (or sometimes known as settings parameters) as defined in HTTP/2 and typically carried in a SETTINGS frame, a QUIC transport parameter used as defined in HTTP/3, a setting (or sometimes known as settings parameters) as defined in HTTP/3 and typically carried in a SETTINGS frame, and/or other frames that control runtime limits such as the MAX STREAMS frame defined in QUIC. The one or more runtime behaviors include: limiting or stopping the use of server push; stopping use or limiting the number of hinted link headers included in a 103 Early Hints response; limiting runtime flow control; using a concurrent response prioritization method that is tuned towards lower resource usage; adjustment of denial-of-service (DoS) mitigation thresholds; modifying the TCP congestion control algorithm or any parameter used to send data to the client; limiting or stopping using dynamic header compression; controlling idle timeouts, and/or limiting or stopping the use of HTTP/2 and/or HTTP/3 extensions such as frame-based extensions (e.g., ORIGIN frame) or WebTransport protocol.

In an embodiment, the HTTP connection manager 124 applies the action(s) for all HTTP/2 and/or HTTP/3 connections. In another embodiment, the HTTP connection manager 124 applies the action(s) for selected HTTP/2 and/or HTTP/3 connections. The HTTP connection modification policy 126 may define specific zones, specific accounts, specific account types, and/or specific HTTP clients in which to apply the action(s). As an example, the HTTP connection manager 124 may perform the actions(s) for HTTP/2 and/or HTTP/3 connections associated with personal or small business accounts and may not perform the action(s) for HTTP/2 and/or HTTP/3 connections associated with enterprise accounts. As another example, if a certain zone has become the target of a selective attack, the HTTP connection manager 124 may perform the action(s) for HTTP/2 and/or HTTP/3 connections only associated for that zone. As another example, if the trigger condition is specific to a particular client or request (e.g., the threat score of the request and/or client is above a threshold, a malicious client is detected, malicious behavior of the client is detected, protocol misuse by the client is detected), the HTTP connection manager 124 may perform the action(s) only for the HTTP/2 and/or HTTP/3 connections specific to that client or request.

When the trigger condition no longer exists, the HTTP connection manager 124 may revert the modifications. As an example, if the trigger condition was that the server CPU usage was greater than a threshold and the server CPU usage fell below that threshold, the HTTP connection manager 124 may revert the modifications it made to the HTTP/2 and/or HTTP/3 connections. In an embodiment, the HTTP connection manager 124 supports different classes or profiles of parameter configuration depending on the lifecycle of the trigger condition and the actions and the different classes or profiles could be phased out differently. For example, for connection resource parameter(s) that applied to new connections while a condition trigger was active (e.g., stream concurrency of HTTP/2 connections, initial window size of HTTP/2 connections, and/or header list size of HTTP/2 connections), the HTTP connection manager 124 may not revert those connection resource parameter(s) for those HTTP connections but otherwise revert the connection resource parameter(s) for other HTTP connections (e.g., those HTTP connections that were opened before the trigger condition, new HTTP connections). As another example, after a trigger condition no longer exists, the HTTP connection manager 124 transitions to a post-trigger class of connection resource parameters that fall between the original connection resource parameters and the modified connection resource parameters. This can help alleviate cases where an attack is periodically turned on and off.

Although this description refers to dynamically modifying HTTP/2 and/or HTTP/3 connections, in an embodiment, the HTTP server 120 can dynamically control TCP window sizes to control data receive rates or send rates on a single HTTP/1.1 connection.

Figure 2:
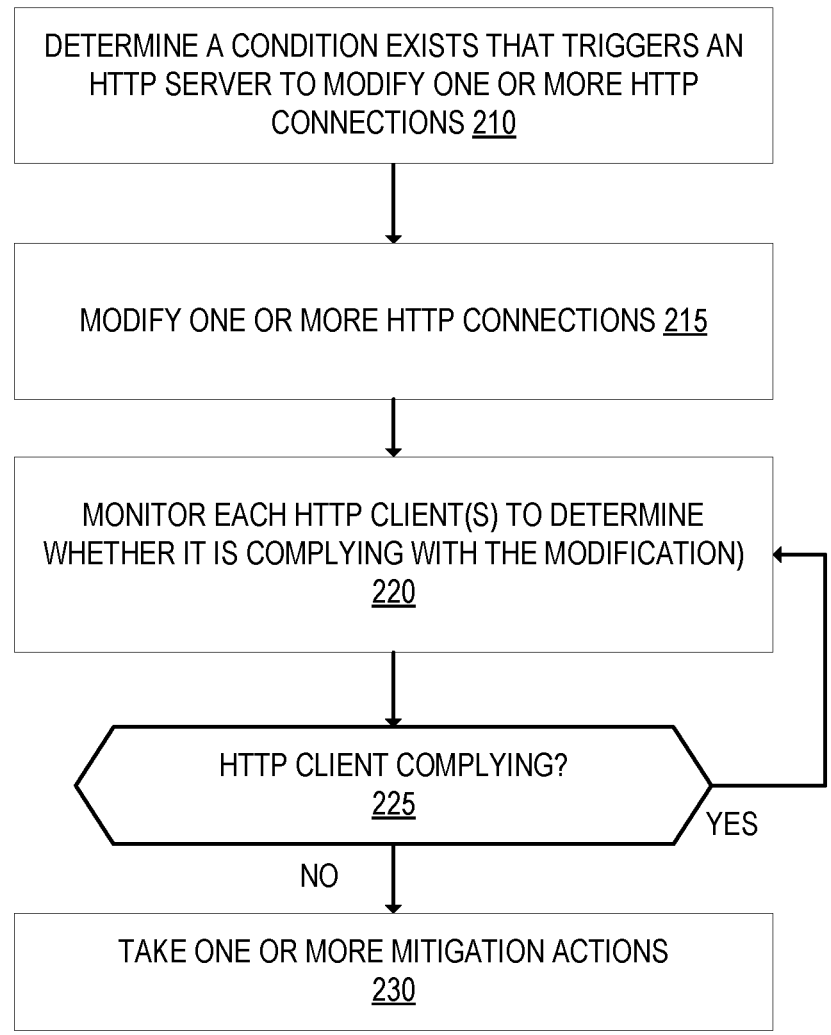
FIG. 2 is a flow diagram that illustrates exemplary operations for dynamically modifying an HTTP connection according to an embodiment.

FIG. 2 is a flow diagram that illustrates exemplary operations for dynamically modifying an HTTP connection according to an embodiment. The operations of FIG. 2 are described with respect to the exemplary embodiment of FIG. 1. However, the operations of FIG. 2 can be performed by different embodiments from that of FIG. 1, and the embodiment of FIG. 1 can perform different operations from that of FIG. 2.

At operation 210, a determination is made that a condition exists that triggers the HTTP server 120 to modify an HTTP connection (e.g., an HTTP/2 and/or HTTP/3 connection). The condition detector 122 may detect whether the condition exists. For instance, the trigger condition(s) may be a hardware resource condition of the server, a characteristic of an HTTP request, a threat score of the request and/or client being above a threshold, a malicious client detected, malicious behavior detected, and/or detected protocol misuse, as described herein. The trigger conditions may be defined in the HTTP connection modification policy 126.

Next, at operation 215, the HTTP server 120 dynamically modifies one or more HTTP connections. For instance, the HTTP connection manager 124 may dynamically modify one or more HTTP connections. The HTTP connection manager 124 may use the HTTP connection modification policy 126 for determining the modifications(s) to make. The modification may include dynamically modifying HTTP connection resource parameter(s) for HTTP connection(s) and/or modifying one or more runtime behaviors for the HTTP connection(s). Dynamically modifying HTTP connection resource parameters may include signaling modified connection resource parameters for existing HTTP connections (e.g., existing HTTP/2 connections) and/or setting new connections with modified connection resource parameter(s) (e.g., new HTTP/2 connections and/or new HTTP/3 connections). The modified connection resource parameter(s) may reduce or restrict properties of the HTTP connection. The connection resource parameters can include a setting (or sometimes known as settings parameters) as defined in HTTP/2 and typically carried in a SETTINGS frame, a QUIC transport parameter used as defined in HTTP/3, a setting (or sometimes known as settings parameters) as defined in HTTP/3 and typically carried in a SETTINGS frame, and/or other frames that control runtime limits such as the MAX STREAMS frame defined in QUIC.

As examples, the HTTP server 120 may perform one or more of the following for existing HTTP/2 connections and/or to apply to new HTTP/2 connections: dynamically reduce the maximum concurrent streams that the HTTP client can open; dynamically change the initial window size to limit the initial amount of data that a client can send as part of the request; dynamically change header list sizes to limit the size of request headers that the client can send to the HTTP server; and dynamically controlling the resources for dynamic decompression of client requests.

As another example, the HTTP server 120 may perform one or more of the following for new HTTP/3 connections: dynamically reducing the value for the max idle timeout transport parameter; dynamically tuning max UDP payload sizes; dynamically reducing the initial flow control limit for peer-initiated bidirectional streams; dynamically reducing the initial flow control limit for unidirectional streams; dynamically reducing the initial maximum number of bidirectional streams the client is permitted to initiate; dynamically reducing the initial maximum number of unidirectional streams the client is permitted to initiate; and dynamically controlling the resources for dynamic decompression of client requests.

Stream concurrency of HTTP/2 connections is managed by the setting SETTINGS_MAX_CONCURRENT_STREAMS. To dynamically reduce the maximum concurrent streams that the HTTP client can open, the HTTP server 120 can send a reduced value for this setting to clients on new HTTP/2 connections and/or send a SETTINGS frame for existing HTTP/2 connections with a reduced value for this setting. Alternatively, the HTTP server 120 can operate a virtual concurrency limit while not communicating the value of this limit. This virtual concurrency limit can be enforced by rejecting streams (e.g., using RST STREAM or serving with an HTTP response such as 5xx) that cause the limit to be met or exceeded.

The initial window size of HTTP/2 connections is managed by the setting SETTINGS_INITIAL_WINDOW_SIZE. To dynamically change the initial window size to limit the initial amount of data that a client can send as part of the request, the HTTP server 120 can send a reduced value for this setting to clients on new HTTP/2 connections and/or send a SETTINGS frame for existing HTTP/2 connections with a reduced value for this setting.

The header list size of HTTP/2 connections is managed by the setting SETTINGS_MAX_HEADER_LIST_SIZE. To dynamically change the header list sizes to limit the size of request headers that the client can send to the HTTP server 120, the HTTP server 120 can send a reduced value for this setting to clients on new HTTP/2 connections and/or send a SETTINGS frame for existing HTTP/2 connections with a reduced value for this setting. Alternatively, the HTTP server 120 can operate a virtual max header list size limit while not communicating the value of this limit. This virtual max header list size limit can be enforced by rejecting streams (e.g., using RST_STREAM or serving with an HTTP response such as 5xx) that cause the limit to be met or exceeded. In all approaches, the size of request headers that can be transmitted to the HTTP server 120 by the HTTP client can be limited.

Dynamic decompression of client requests of HTTP/2 connections is managed by the setting SETTINGS_HEADER_TABLE_SIZE. This setting notifies the client of the size of the table supported by the HTTP server 120. A zero size disables the dynamic decompression. To dynamically change the dynamic decompression, the HTTP server 120 can send a reduced value for this setting to clients on new HTTP/2 connections and/or send a SETTINGS frame for existing HTTP/2 connections with a reduced value for this setting.

The idle timeout for HTTP/3 connections is managed by the max idle timeout transport parameter. The HTTP server 120 can reduce the value for this transport parameter for new HTTP/3 connections to reduce resource burdens by shedding clients earlier.

The maximum UDP payload sizes for HTTP/3 connections is managed by the max_udp_payload_size transport parameter. This parameter limits the size of UDP payloads that the HTTP server is willing to receive and payloads that are larger than this limit may not be processed by the HTTP server 120. The HTTP server 120 can dynamically tune the value of this transport parameter up or down for new HTTP/3 connections to alter the workload of the services which may lead to reduced resource usage.

The initial flow control limit for peer-initiated bidirectional streams for HTTP/3 connections is managed by the initial_max_stream_data_bidi_remote transport parameter. The HTTP server 120 can dynamically reduce the value for this transport parameter for new HTTP/3 connections to limit the initial amount of data that an HTTP client can send on request streams.

The initial flow control limit for unidirectional streams for HTTP/3 connections is managed by the initial_max_stream_data_uni transport parameter. The HTTP server 120 can dynamically reduce this value for new HTTP/3 connections to limit the initial amount of data that an HTTP client can send on unidirectional streams. These unidirectional streams can be special cases for new use cases or benign "grease streams" that exercise extension mechanisms. A grease stream uses a range of values for the stream type that are reserved for the purpose of exercising unidirectional streams. New use cases can be an HTTP/3 extension that has a need to send data unidirectionally such as the WebTransport protocol.

The initial maximum number of bidirectional streams the client is permitted to initiate for an HTTP/3 connection is managed by the initial_max_streams_bidi transport parameter. The HTTP server 120 can dynamically reduce this value for new HTTP/3 connections to limit the initial bidirectional stream concurrency.

The initial maximum number of unidirectional streams the client is permitted to initiate for an HTTP/3 connection is managed by the initial_max_streams_uni transport parameter. The HTTP server 120 can dynamically reduce this value for new HTTP/3 connections to limit the initial unidirectional stream concurrency.

Dynamic decompression of client requests of HTTP/3 connections is managed by QPACK_MAX_TABLE_CAPACITY. This value notifies the client of the size of the table supported by the HTTP server 120. A zero size disables the dynamic decompression. To dynamically change the dynamic decompression, the HTTP server 120 can send a reduced value for this setting to clients on new HTTP/3 connections with a reduced value for this setting.

The change that affects one or more HTTP connections may include changing one or more runtime behaviors for the HTTP connection(s). The one or more runtime behaviors include: limiting or stopping the use of server push; stopping use or limiting the number of hinted link headers included in a 103 Early Hints response; limiting runtime flow control; using a concurrent response prioritization method that is tuned towards lower resource usage; adjustment of denial-of-service (DoS) mitigation thresholds; modifying the TCP congestion control algorithm or any parameter used to send data to the client; limiting or stopping using dynamic header compression; controlling idle timeouts, and/or limiting or stopping the use of HTTP/2 and/or HTTP/3 extensions such as frame-based extensions (e.g., ORIGIN frame) or WebTransport protocol.

Regarding server push, if server push is implemented by the HTTP server 120 (e.g., as described in section 8.4 of RFC 9113 and section 4.6 of RFC 9114), the HTTP server 120 can stop or limit the use of server push even if a connection supports it (e.g., limit the number of pushes or send no pushes). Regarding 103 Early Hints, if 103 Early Hints is implemented by the HTTP server (e.g., as described in RFC 8297), the HTTP server 120 can stop issuing the 103 Early Hints or limit the number of hinted link headers in a 103 Early Hints response. Regarding limiting runtime flow control, the HTTP server 120 can tune the window credits given to clients (e.g., WINDOW_UPDATE frames in HTTP/2 and MAX_DATA and MAX_STREAM_DATA frames in HTTP/3) to limit the data rate of client upload requests. Regarding the concurrent response prioritization method, the HTTP server 120 can use a concurrent response prioritization method that is tuned towards lower resource usage as compared to under normal circumstances where such a prioritization scheme may be tuned towards fast web site loading. Regarding adjusting DoS mitigation thresholds, the HTTP server 120 can adjust a DoS mitigation threshold such that some clients are rejected or restricted. Regarding modifying the TCP congestion control algorithm or other TCP related resources, the HTTP server 120 can modify the TCP congestion control algorithm to slow down the sending rate to the client to reduce egress bandwidth and potentially reduce the rate of inbound requests due to responses taking longer to complete. Regarding limiting or stopping using dynamic header compression, the HTTP server 120 can stop compressing headers or use a less intensive compression. Regarding controlling idle timeouts, the HTTP server 120 can reduce the timeout periods for various messages and events (e.g., the period between receiving HTTP headers and HTTP body, the period between chunks of HTTP body). Regarding limiting or stopping the use of HTTP/2 and/or HTTP/3 extensions, the HTTP server 120 can stop these extensions or limit their use to reduce workload (these extensions may require additional work compared to conventional HTTP), to force clients to use certain protocols, and/or to react to targeted attacks at particular extensions.

In an embodiment, the HTTP server 120 makes the change(s) for all HTTP/2 and/or HTTP/3 connections. In another embodiment, the HTTP server 120 makes the change(s) only for selected HTTP/2 and/or HTTP/3 connections. For instance, the HTTP server may make the change(s) only for HTTP/2 and/or HTTP/3 connections for specific zones, specific accounts, specific account types, and/or specific HTTP clients. As an example, the HTTP server 120 may make the change(s) for personal or small business accounts and may not make the change(s) for enterprise accounts. As another example, if a certain zone has become the target of a selective attack, the HTTP server 120 may make the change(s) for the HTTP/2 and/or HTTP/3 connections for that zone. As another example, if the trigger condition is specific to a particular client or request (e.g., the threat score of the request and/or client is above a threshold, behavior of the client, protocol misuse by the client), the HTTP server 120 may make the change(s) only for the HTTP connections specific to that client or request.

Next, at operation 220, which may not be performed in all embodiments, the HTTP server 120 monitors the protocol behavior of HTTP clients that connect through the modified HTTP/2 and/or HTTP/3 connections. The monitoring depends on the change that was made to the HTTP connection. For example, if the change is to reduce the number of concurrent streams, the HTTP server monitors the number of concurrent streams. If the change is to the initial window size, the HTTP server monitors the initial window size.

Next, at operation 225, which also may not be performed in all embodiments, the HTTP server 120 determines whether the HTTP client is complying with the modifications. If the HTTP client is not complying with the modifications, then operation 230 is performed where the HTTP server 120 takes one or more mitigation actions. The one or more mitigation actions may include closing the HTTP connection or applying rate limiting to the HTTP client. If the client reconnects after closing the HTTP connection, the HTTP server 120 may apply rate limiting to the HTTP client. As an example, if the modification is to reduce the number of concurrent streams and the HTTP client is not complying with the modification, the HTTP server 120 may terminate the connection with an error message. For an existing HTTP connection, complying with the modification may not happen immediately. For instance, if the change is on an existing HTTP/2 connection and is to reduce the maximum number of concurrent streams, the expectation is that the HTTP client will reduce the number of concurrent streams until the target value is hit but does not need to close streams prematurely. If the HTTP client is complying with the modifications, then flow moves back to operation 220.

The operations 220, 225, and 230 may not be performed if the change does not require the HTTP client to make a modification or otherwise involve the HTTP client to comply with the desired protocol behavior. For instance, a change that only affects the runtime behavior of an HTTP connection at the server does not need to be monitored. As an example, if the change includes stopping the use of server push or 103 Early Hints, the HTTP server does not need to monitor the client for the stopping of the server push or 103 Early Hints.

Figure 3:
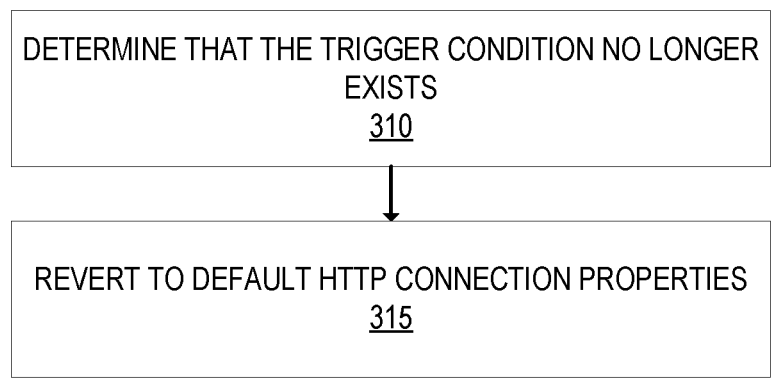
FIG. 3 is a block diagram that illustrates exemplary operations for reverting an HTTP connection back to a default state according to an embodiment.

FIG. 3 is a block diagram that illustrates exemplary operations for reverting an HTTP connection back to a default state according to an embodiment. The operations of FIG. 3 are described with respect to the exemplary embodiment of FIG. 1. However, the operations of FIG. 3 can be performed by different embodiments from that of FIG. 1, and the embodiment of FIG. 1 can perform different operations from that of FIG. 3.

At operation 310, a determination is made that the trigger condition no longer exists. The condition detector 122 may determine that the trigger condition no longer exists. For example, if the trigger condition was that the server CPU usage was greater than a threshold, the condition detector 122 determines when the server CPU usage falls below the threshold. The condition detector 122 may notify or instruct the HTTP connection manager 124 that a trigger condition no longer exists.

At operation 315, the HTTP server 120 (e.g., the HTTP connection manager 124) reverts to the default HTTP connection properties (e.g., the properties for the HTTP connections prior to the modification). As an example, if the trigger condition was that the server CPU usage was greater than a threshold and the server CPU usage fell below that threshold, the HTTP connection manager 124 may revert the modifications it made to the HTTP/2 and/or HTTP/3 connections.

In an embodiment, the HTTP connection manager 124 supports different classes or profiles of parameter configuration depending on the lifecycle of the trigger condition and the actions and the different classes or profiles could be phased out differently. For example, for connection resource parameter(s) that applied to new connections while a condition trigger was active (e.g., stream concurrency of HTTP/2 connections, initial window size of HTTP/2 connections, and/or header list size of HTTP/2 connections), the HTTP connection manager 124 may not revert those connection resource parameter(s) for those HTTP connections but otherwise revert the connection resource parameter(s) for other HTTP connections (e.g., those HTTP connections that were opened before the trigger condition, new HTTP connections). As another example, after a trigger condition no longer exists, the HTTP connection manager 124 transitions to a post-trigger class of connection resource parameters that fall between the original connection resource parameters and the modified connection resource parameters.

Figure 4:
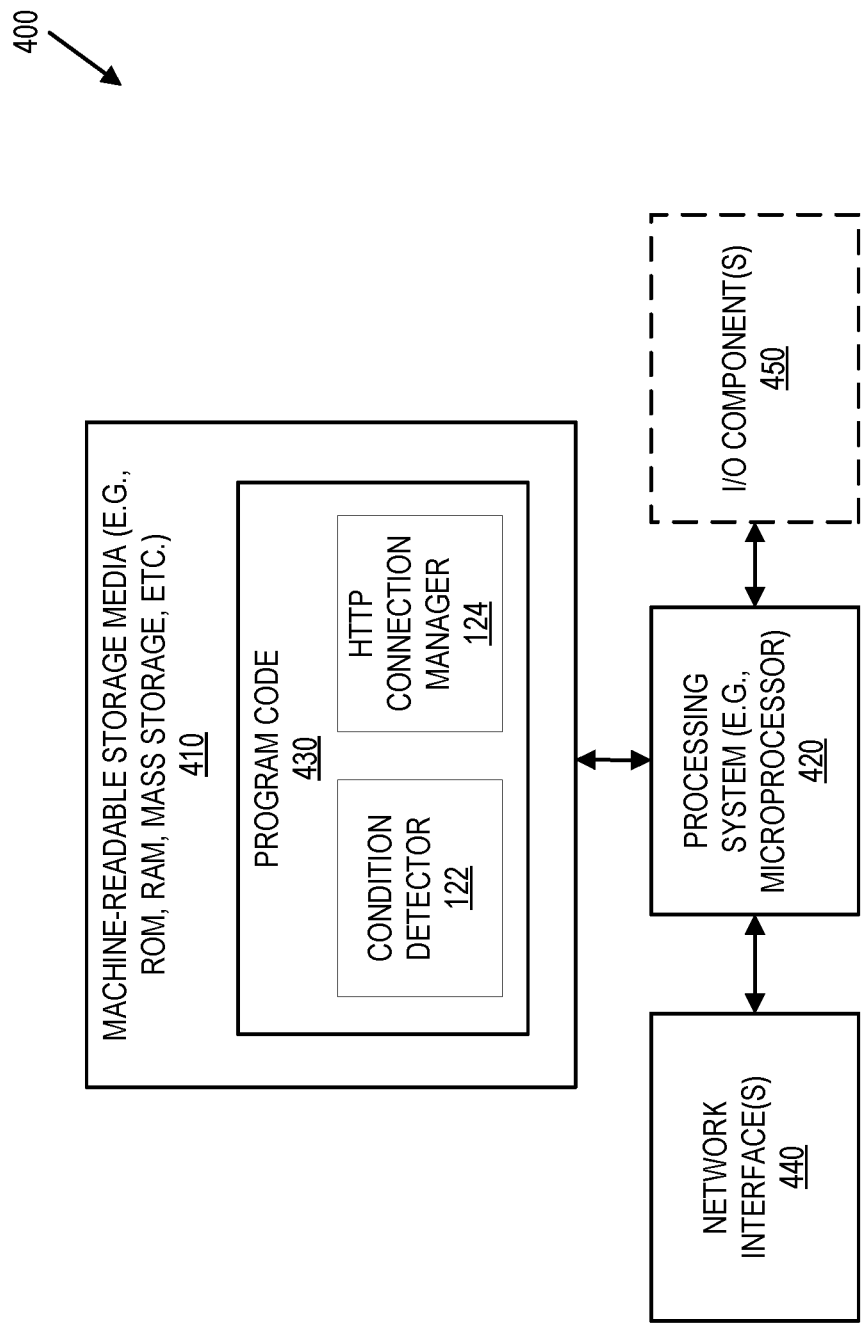
FIG. 4 is a block diagram illustrating a data processing system that can be used in an embodiment.

FIG. 4 illustrates a block diagram for an exemplary data processing system 400 that may be used in some embodiments. One or more such data processing systems 400 may be utilized to implement the embodiments and operations described with respect to an HTTP client 110 and/or HTTP server 120.

Data processing system 400 includes a processing system 420 (e.g., one or more processors and connected system components such as multiple connected chips). The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420. For example, the depicted machine-readable storage media 410 may store program code 430 that, when executed by the processor(s) 420, causes the data processing system 400 to execute the condition detector 122, the HTTP connection manager 124, and/or any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in One or more buses may be used to interconnect the various components shown in FIG. 4.

The techniques shown in the figures can be implemented using code and data stored and executed on one or more electronic devices (e.g., a client device, a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. It will be appreciated, however, by one skilled in the art that the invention may be practiced without such specific details. In other instances, control structures, gate level circuits and full software instruction sequences have not been shown in detail to not obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   determining that a condition exists that triggers an HTTP server to modify one or more HTTP connections for one or more HTTP clients that are connected to the HTTP server;
   dynamically modifying, at the HTTP server, the one or more HTTP connections including dynamically modifying a value for one or more HTTP connection resource parameters for the one or more HTTP connections;

sending, from the HTTP server, an indication of the dynamic modification to the one or more HTTP connections to the one or more HTTP clients, the indication including the dynamically modified value for the modified one or more HTTP connection resource parameters;

for each of the one or more HTTP clients, monitoring that HTTP client to determine whether it is complying with the modified one or more HTTP connection resource parameters; and determining, from the monitoring, that one of the one or more HTTP clients is not complying with the modified one or more HTTP connection resource parameters, and responsive to this determination, closing an HTTP connection to that HTTP client.

2. The method of claim 1, wherein the determined condition is one of: CPU usage is above a first threshold and memory usage is above a second threshold.

3. The method of claim 1, wherein the determined condition is one of: a predefined characteristic of an HTTP request, a threat score associated with the HTTP request above a first threshold, a threat score associated with an HTTP client is above a threshold, malicious behavior of an HTTP client has been detected, and protocol misuse has been detected.

4. The method of claim 1, wherein dynamically modifying the one or more HTTP connection resource parameters for the one or more HTTP connections is performed on open one or more HTTP connections.

5. The method of claim 1, further comprising:
applying the modified one or more HTTP connection resource parameters to new HTTP connections.

6. The method of claim 1, wherein dynamically modifying the one or more HTTP connection resource parameters for the one or more HTTP connections includes performing one or more of the following: reducing a maximum concurrent stream value, reducing an initial window size, reducing header list size, and controlling resources for dynamic decompression of client requests.

7. The method of claim 1, wherein dynamically modifying, at the HTTP server, the one or more HTTP connections further includes modifying one or more runtime behaviors for one or more HTTP connections.

8. A non-transitory machine-readable storage medium that provides instructions that, if executed by a processor, will cause said processor to perform operations comprising, comprising:

determining that a condition exists that triggers an HTTP server to modify one or more HTTP connections for one or more HTTP clients that are connected to the HTTP server;

dynamically modifying, at the HTTP server, the one or more HTTP connections including dynamically modifying a value for one or more HTTP connection resource parameters for the one or more HTTP connections;

sending, from the HTTP server, an indication of the dynamic modification to the one or more HTTP connections to the one or more HTTP clients, the indication including the dynamically modified value for the modified one or more HTTP connection resource parameters;

for each of the one or more HTTP clients, monitoring that HTTP client to determine whether it is complying with the modified one or more HTTP connection resource parameters; and determining, from the monitoring, that one of the one or more HTTP clients is not complying with the modified one or more HTTP connection resource parameters, and responsive to this determination, closing an HTTP connection to that HTTP client.

9. The non-transitory machine-readable storage medium of claim 8, wherein the determined condition is one of: CPU usage is above a first threshold and memory usage is above a second threshold.

10. The non-transitory machine-readable storage medium of claim 8, wherein the determined condition is one of: a predefined characteristic of an HTTP request, a threat score associated with the HTTP request above a first threshold, a threat score associated with an HTTP client is above a threshold, malicious behavior of an HTTP client has been detected, and protocol misuse has been detected.

11. The non-transitory machine-readable storage medium of claim 8, wherein dynamically modifying the one or more HTTP connection resource parameters for the one or more HTTP connections is performed on open one or more HTTP connections.

12. The non-transitory machine-readable storage medium of claim 8, wherein the operations further comprise:
applying the modified one or more HTTP connection resource parameters to new HTTP connections.

13. The non-transitory machine-readable storage medium of claim 8, wherein dynamically modifying the one or more HTTP connection resource parameters for the one or more HTTP connections includes performing one or more of the following: reducing a maximum concurrent stream value, reducing an initial window size, reducing header list size, and controlling resources for dynamic decompression of client requests.

14. The non-transitory machine-readable storage medium of claim 8, wherein dynamically modifying, at the HTTP server, the one or more HTTP connections further includes modifying one or more runtime behaviors for one or more HTTP connections.

15. An HTTP server, comprising:
a processor; and
a non-transitory machine-readable storage medium that provides instructions that, if executed by the processor, will cause the HTTP server to perform operations including:

determining that a condition exists that triggers the HTTP server to modify one or more HTTP connections for one or more HTTP clients that are connected to the HTTP server;

dynamically modifying, at the HTTP server, the one or more HTTP connections including dynamically modifying a value for one or more HTTP connection resource parameters for the one or more HTTP connections;

sending, from the HTTP server, an indication of the dynamic modification to the one or more HTTP connections to the one or more HTTP clients, the indication including the dynamically modified value for the modified one or more HTTP connection resource parameters;

for each of the one or more HTTP clients, monitoring that HTTP client to determine whether it is complying with the modified one or more HTTP connection resource parameters; and determining, from the monitoring, that one of the one or more HTTP clients is not complying with the modified one or more HTTP connection resource parameters, and responsive to this determination, closing an HTTP connection to that HTTP client.

16. The HTTP server of claim 15, wherein the determined condition is one of: CPU usage is above a first threshold and memory usage is above a second threshold.

17. The HTTP server of claim 15, wherein the determined condition is one of: a predefined characteristic of an HTTP request, a threat score associated with the HTTP request above a first threshold, a threat score associated with an HTTP client is above a threshold, malicious behavior of an HTTP client has been detected, and protocol misuse has been detected.

18. The HTTP server of claim 15, wherein dynamically modifying the one or more HTTP connection resource parameters for the one or more HTTP connections is performed on open one or more HTTP connections.

19. The HTTP server of claim 15, wherein the operations further comprise:
   applying the modified one or more HTTP connection resource parameters to new HTTP connections.

20. The HTTP server of claim 15, wherein dynamically modifying the one or more HTTP connection resource parameters for the one or more HTTP connections includes performing one or more of the following: reducing a maximum concurrent stream value, reducing an initial window size, reducing header list size, and controlling resources for dynamic decompression of client requests.

21. The HTTP server of claim 15, wherein dynamically modifying, at the HTTP server, the one or more HTTP connections further includes modifying one or more runtime behaviors for one or more HTTP connections.

\* \* \* \* \*